Oct. 13, 1942.  V. HICKS ET AL  2,298,942
BIPLANAR FLUOROSCOPIC AND RADIOGRAPHIC EQUIPMENT
Filed Nov. 30, 1940  3 Sheets-Sheet 1

INVENTOR
V. HICKS
E. E. MERKEL
BY
ATTORNEY

Oct. 13, 1942.  V. HICKS ET AL  2,298,942
BIPLANAR FLUOROSCOPIC AND RADIOGRAPHIC EQUIPMENT
Filed Nov. 30, 1940  3 Sheets-Sheet 2

INVENTOR
V. HICKS
E. E. MERKEL
BY
ATTORNEY

Oct. 13, 1942.    V. HICKS ET AL    2,298,942
BIPLANAR FLUOROSCOPIC AND RADIOGRAPHIC EQUIPMENT
Filed Nov. 30, 1940    3 Sheets-Sheet 3
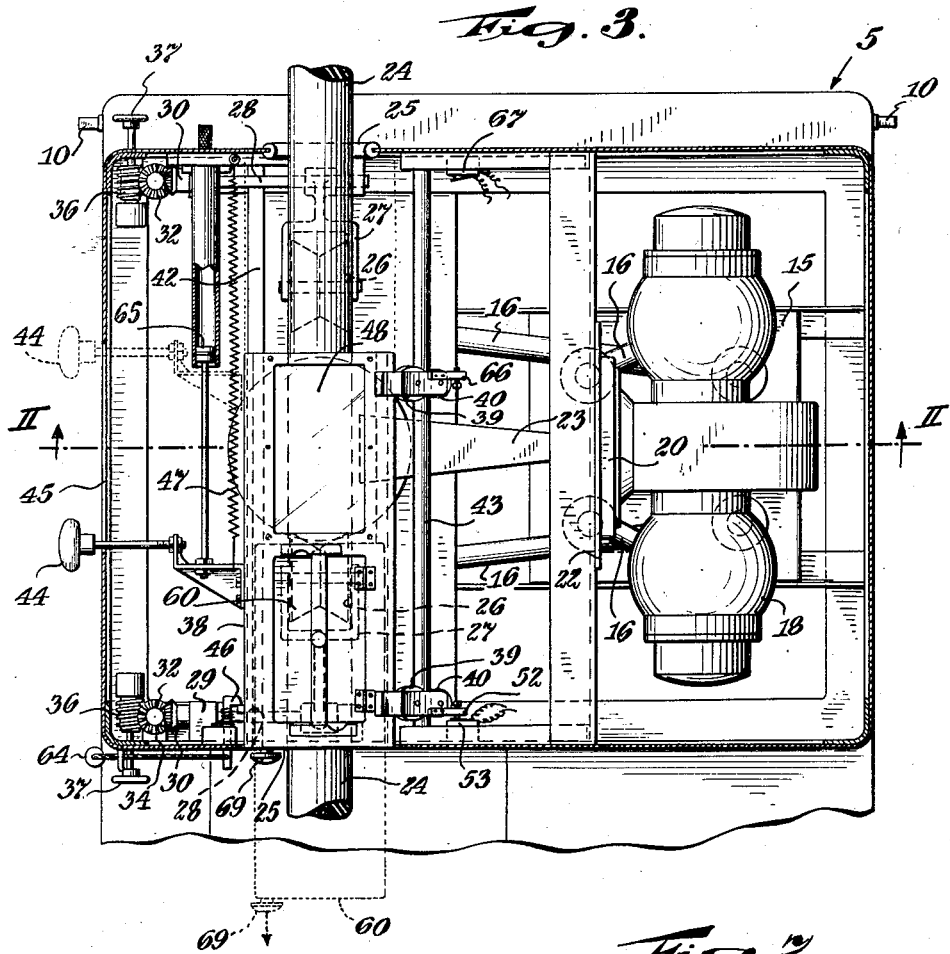
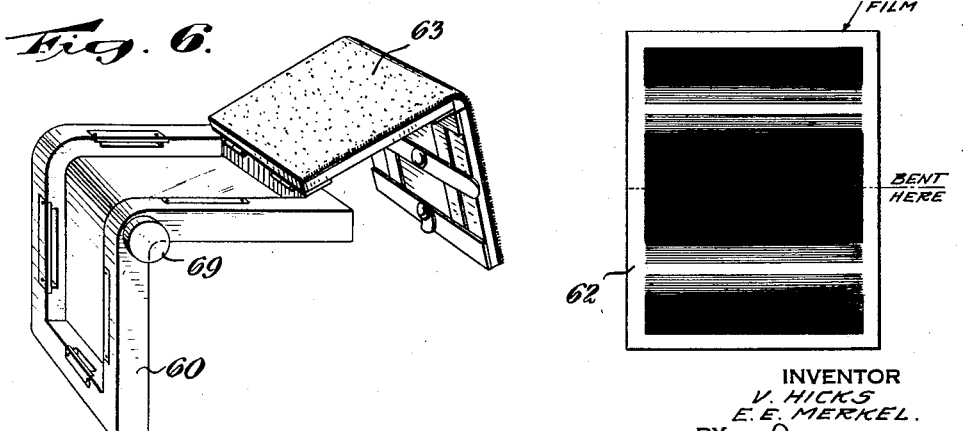
INVENTOR
V. HICKS
E. E. MERKEL.
BY
ATTORNEY Patented Oct. 13, 1942

2,298,942

UNITED STATES PATENT OFFICE 2,298,942

BIPLANAR FLUOROSCOPIC AND RADIOGRAPHIC EQUIPMENT

Victor Hicks, Flushing, and Eugene E. Merkel, New York, N. Y., assignors, by mesne assignments, to Westinghouse Electric and Manufacturing Company, East Pittsburgh, Pa., a corporation of Pennsylvania Application November 30, 1940, Serial No. 367,912

8 Claims. (Cl. 250—53)

The present invention relates to X-ray apparatus and more particularly to such apparatus for the visual inspection of a continuously moving article such as electric cable.

In the manufacture of insulated wire or cable, it is customary to form the cable of one or more continuous solid conductors of many feet in length. Following the drawing or forming of the metallic conductor, an insulating material of suitable dielectric strength and wear-resistant properties is cast or molded about the metallic conductor. Inasmuch as the current carrying capacity of the cable is determined by the cross-sectional area of the metallic conductor and the breakdown strength of the dielectric, it is essential that the conductor be coaxially disposed relative to the surrounding dielectric to insure uniformity of insulation properties.

For various reasons including manufacturing difficulties, it has been impossible to determine whether coaxiality is obtained to the desired degree since inspection methods heretofore have been limited to a visual inspection of the cable ends or the cutting of the cable at selected lengths to inspect its cross section. Such method, however, obviously gives no assurance as to uniformity of insulation throughout the cable length.

It is accordingly an object of the present invention to provide an apparatus which enables visual inspection of electric cable throughout its entire length.

Another object of the present invention is the provision of an X-ray apparatus continuously operable for the purpose of enabling visual inspection of electric cable throughout its entire length.

Another object of the present invention is the provision of biplanar fluoroscopic and radiographic X-ray apparatus wherein the medians of two X-ray beams and an electrical cable are orthogonal or non-coplanar so that an image of the cable is cast upon a pair of fluorescent screens which, through suitably positioned mirrors, enable a continuous visual inspection of the cable.

Still further objects of the present invention will become obvious to those skilled in the art by reference to the accompanying drawings wherein:

Fig. 3 is a sectional view taken on the line III—III of Fig. 2 and looking in the direction indicated by the arrows;

Fig. 6 is a perspective view of the angular cassette employed with the apparatus of the present invention for holding sensitized films used in the making of radiographic exposures of the electric cable when desired, and Fig. 7 is an illustration of a developed film taken with the apparatus of the present invention.

Figure 1:
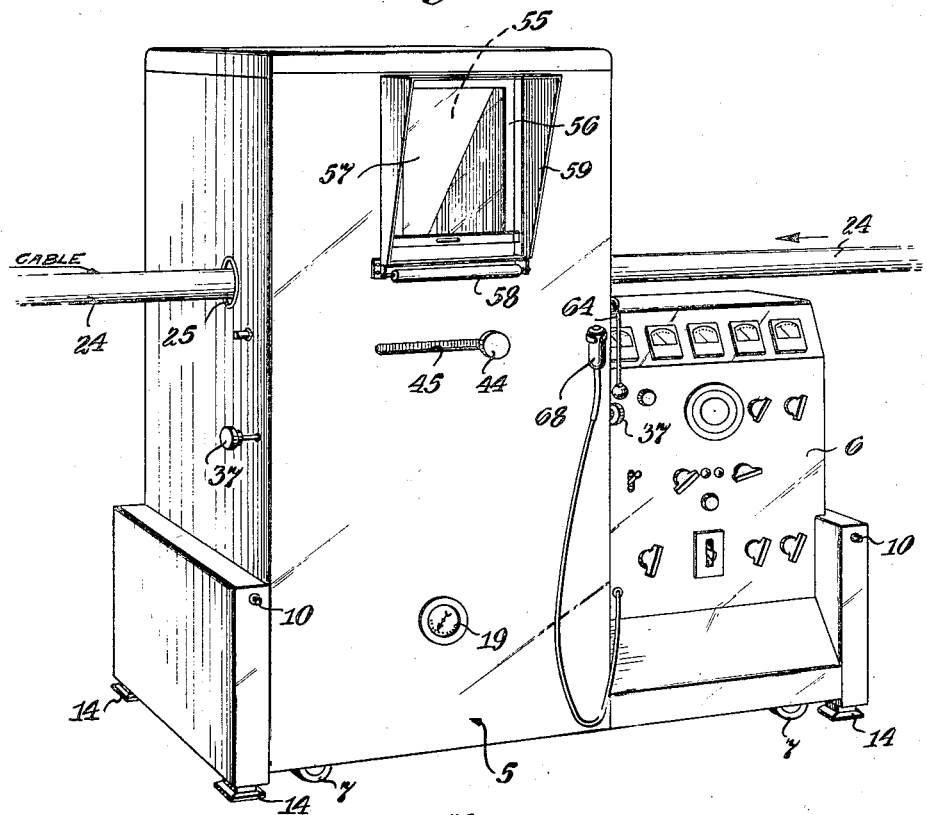
Fig. 1 is a perspective view of the cable apparatus constructed in accordance with the present invention.

Referring now to the drawings in detail, the apparatus as shown in Fig. 1 comprises a cabinet 5 housing the entire inspection apparatus which is operated from a control panel 6 forming part of the cabinet. By reference more particularly to Fig. 2, it will be seen that the cabinet is mobile about the floor by rubber-tired casters or the like 7 secured to a pair of shafts 8 which are journaled in suitable bearing supports 9 and these casters may be made to swivel in any well-known manner. When desired, the entire apparatus can be made immobile by manual rotation of a pair of shafts 10 which carry beveled gears 12 meshing with cooperating gears 13 carried by jack supports 14. Rotation of the shafts 10 by a crank or the like (not shown) thus raises or lowers the jack supports 14 to raise the casters 7 from the floor when immobility is desired or reverses movement of the jack supports and casters to render the entire apparatus mobile.

A high tension transformer 15 having filament heating coils is mounted within the cabinet 5 upon the base frame and is connected by high voltage cables 16 to a pair of X-ray tubes preferably immersed in oil within metal housings 17 and 18, which have adequate lead protection as is well known in the art. The two X-ray tubes and their respective filament heating transformers are so arranged that the X-ray tubes pass current through the transformer in opposite directions, which is 180° out of phase. The X-ray tubes may be cooled during operation by water coils attached to the housings and the cabinet is shown provided with a dial 19 for indicating the pressure of the cooling water supply.

Figure 2:
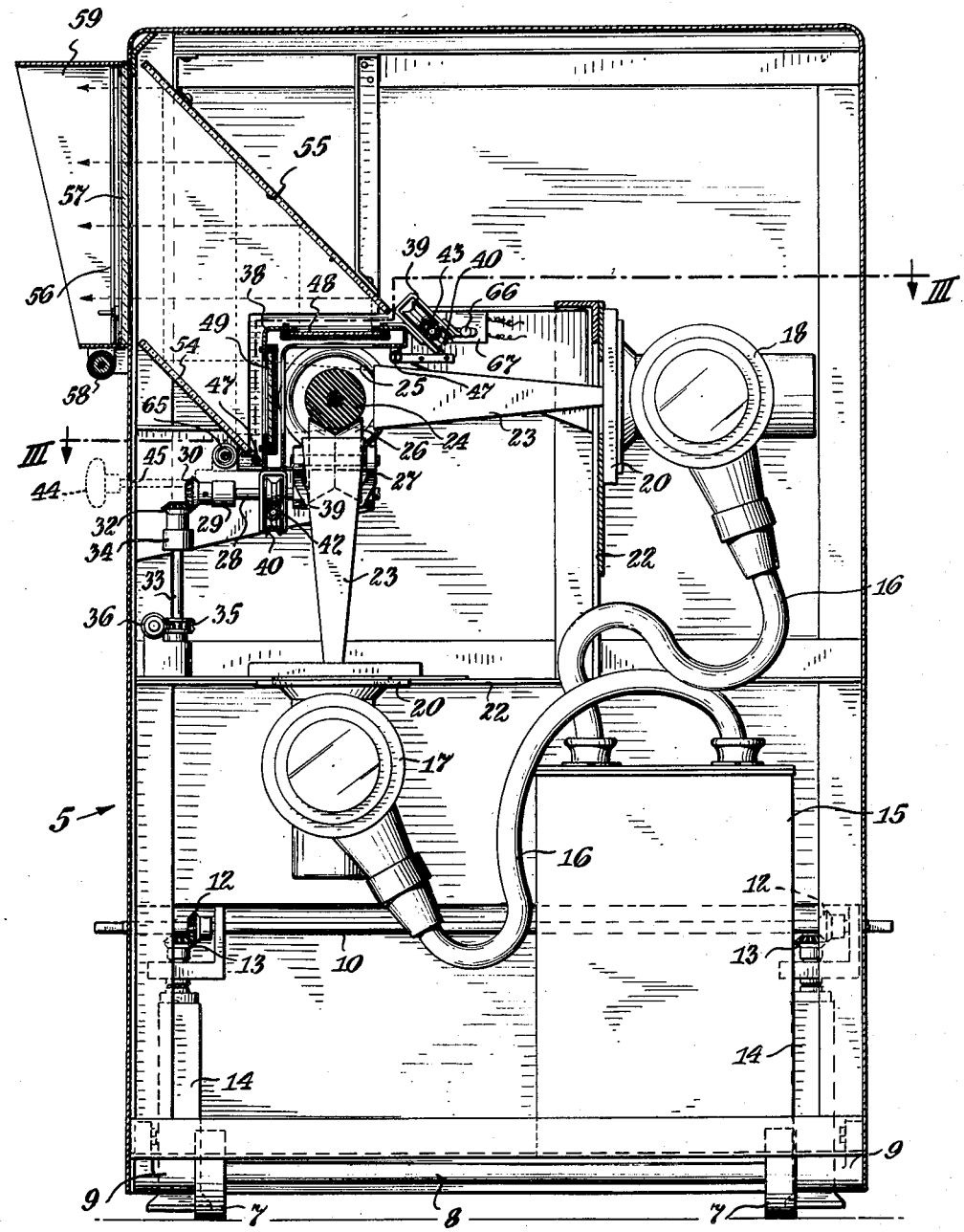
Fig. 2 is a cross-sectional view of the apparatus shown in Fig. 1 taken on the line II—II of Fig. 3 and looking in the direction indicated by the arrows.

As shown in Fig. 2, the X-ray tube units 17 and 18 are supported by suitable brackets 20 secured to partitions or the like 22, and each X-ray tube unit is provided with a rectangular lead-lined cone 23 angularly disposed relative to each other to limit the X-ray beam from each tube to a desired area and so that their medians intersect the axis of the cable or material to be inspected.

The electric cable 24 which is to be inspected passes continuously through openings 25 provided in the sides of the cabinet 5 and is supported interiorly of the cabinet by suitable pulleys 26. As can be seen in Figs. 2 and 3, these pulleys are journaled to bifurcated brackets 27 secured to a horizontally extending shaft 28. These shafts 28 are journaled in suitable bearing supports 29 and are provided at one end with a beveled gear 30 which meshes with a cooperating beveled gear 32 carried by the end of a vertical shaft 33 journaled in bearing supports 34. A worm gear 35 is also affixed to the shafts 33 which is engaged by a worm 36 rotatable by a hand knob 37 protruding on each side of the cabinet 5. Thus the pulleys 26 are adjustable about the axis formed by the connection between the supporting brackets 27 and the shafts 28 to accommodate different diameter cable and align the axis thereof with the coinciding medians of the two angularly disposed X-ray beams during continued passage of the cable through the apparatus.

Figure 4:
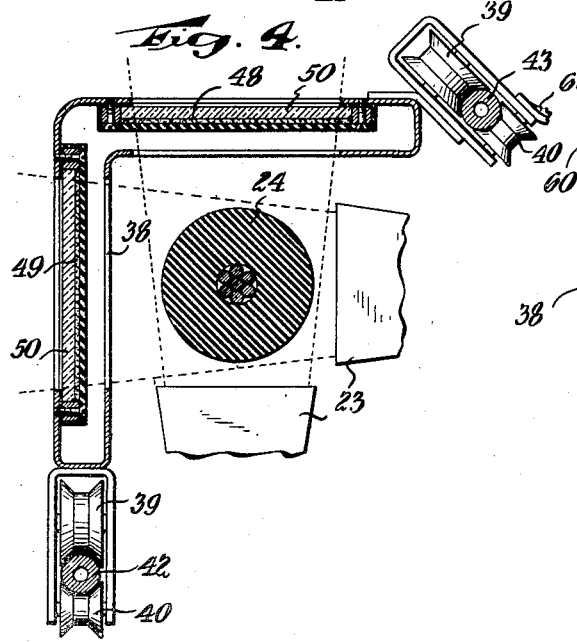
Fig. 4 is a sectional view on an enlarged scale of the fluoroscopic and radiographic carriage which forms a part of the present invention and showing more specifically the fluoroscopic portion of such carriage.

A fluoroscopic-radiographic carriage 38 of substantially L-shaped configuration is disposed interiorly of the cabinet 5 and is provided with upper and lower rollers 39 and 40 engageable with a pair of guide rails 42 and 43 to enable transverse movement of the carriage relative to the cabinet. For the making of routine visual inspection of the cable 24, the carriage is moved by the handle 44 protruding through a slot 45 in the front of the cabinet to the position shown in Fig. 3 where it is held by a spring-pressed latch 46 against the tension of an expanded coil spring 47. In this position of the carriage a fluorescent screen 48 is supported perpendicular to the X-ray beam from the tube unit 17, and in a similar manner another fluorescent screen 49 is supported by the carriage perpendicular to the X-ray beam from the tube unit 18. The area of the screens 48 and 49, as can be appreciated from Fig. 4, are such as to be completely impinged by the respective X-ray beams under the direction of the cones 23, and these screens are protected by lead glass 50 of suitable thickness. To condition the energizing circuits for both X-ray tubes for fluoroscopy, a lug 52 causes closure of a switch 53 when the carriage is in the fluoroscopic position, as shown in Fig. 3. This connects the various controls so that both X-ray tubes are continuously operated for fluoroscopy at a current of approximately 10 milliamperes and voltage of about 90 kilovolts. At the same time the switch 53 may operate a control relay for starting the mechanism which feeds the material into the inspection apparatus.

For the purpose of viewing the fluorescent screens, a pair of mirrors 54 and 55 are provided which are so inclined to the fluorescent screens 48 and 49 and to each other as to produce a parallel reflection from the two screens in the upper larger area mirror 55. The image formed on the fluorescent screens are observed on the mirror 55 through a viewing aperture 56 in the front of the cabinet 5. As can be seen in Figs. 1 and 2, this viewing aperture is provided with a protective lead glass 57, a roller screen 58 to limit the visual field, and a hood 59 to exclude extraneous light.

Figure 5:
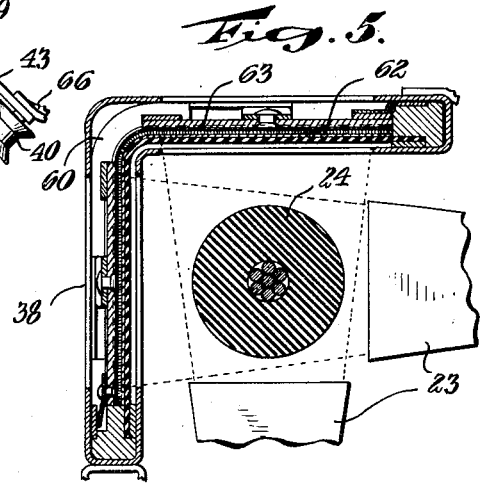
Fig. 5 is a sectional view on an enlarged scale similar to Fig. 4 but showing the radiographic portion of the carriage.

When desired, an inspector may make a radiograph of any portion of the cable or conductor. For this purpose a special L-shaped cassette 60 is provided, as shown in Fig. 6, which bends a single film 62 (Fig. 7) at right angles when positioned interiorly of the cassette with the film resting against a felt backing 63. This cassette slides firmly into the hollow carriage 38, as shown in Figs. 3 and 5, and in the fluoroscopic position of the carriage the cassette is disposed at one end completely shielded from the X-ray beams by the respective cones 23.

To take a radiograph the operator merely pulls on a trip cord 64 which causes release of the spring held catch 46; and since the carriage is held under tension by the spring 47, it is moved by this spring to the left (upward as viewed in Fig. 3), as shown in dotted lines in Fig. 3, where it is stopped by suitable means, such as an air check 65. At the same time the fluoroscopic conditioning switch 53 is opened and when the carriage comes to rest in the radiographic position, not only is the angular film disposed in the field of the two X-ray beams, but a lug 66 engages a radiagraphic conditioning switch 67 to connect the radiographic filament regulators (not shown) and the timer (controlled by push button 68—Fig. 1) into the energizing circuits for the two X-ray tubes. Following the radiographic exposure by depression of the button 68, the carriage is manually returned to the fluoroscopic position by movement of the handle 44 in the slot 45 to again engage the latch 46. The cassette 60 is then withdrawn from the carriage 38 by a handle or knob 69 and taken to the dark room for removal and development of the film 62.

It thus becomes obvious to those skilled in the art that a biplanar fluoroscopic and radiographic apparatus is herein provided which is particularly adaptable to the inspection of electric cable. The cable under inspection passes continuously through the apparatus on two pulleys which are adjustable so that any size cable within limits, may be made to have its axis pass through the intersection of the median X-ray beams. Each of the two fluorescent screens is perpendicular to the median X-ray beam from the corresponding tube so that two true projections of the cable, each magnified by approximately 10 to 15 percent, are thus obtained. The image formed on each screen it then projected on the parallel mirrors inclined at about 45° to the screens so that an operator looking horizontally into the viewing aperture observes these two projections side by side in a vertical plane. Moreover, whenever desired, the apparatus can be readily changed and a radiograph taken of any section of the cable. It is also believed equally obvious that the present invention can be readily employed for the inspection of material other than cable, such for example, as rope, tubing, manufactured or assembled articles, and the like.

Although one specific embodiment of the present invention has been shown and described, it is to be understood that other modifications thereof may be made without departing from the spirit and scope of the appended claims.

We claim:

1. A biplanar fluoroscopic and radiographic apparatus comprising a cabinet, means for passing an article to be inspected through said cabinet, a source for projecting a beam of X-rays in a preselected direction, a second source for projecting another beam of X-rays which is non-colinear relative to said first beam to cause the medians of the two X-ray beams to intersect on the axis of movement of the article to be inspected, a pair of fluorescent screens each disposed perpendicular to the median of the respective X-ray beams, and means for observing the image cast on said fluorescent screens to enable an operator to visually inspect the article during transit through said cabinet.

2. A biplanar fluoroscopic and radiographic apparatus comprising a cabinet, means for passing an article to be inspected through said cabinet, a source for projecting a beam of X-rays in a preselected direction, a second source for projecting another beam of X-rays, the medians of both said X-ray beams and the axis of movement of said article to be inspected being orthogonal relative to each other, a pair of fluorescent screens each disposed perpendicular to the median of the respective X-ray beams, and means for observing the image cast on said fluorescent screens to enable an operator to visually inspect the article during transit through said cabinet.

3. A biplanar fluoroscopic and radiographic apparatus comprising a cabinet, means for passing an article to be inspected through said cabinet, a source for projecting a beam of X-rays in a preselected direction, a second source for projecting another beam of X-rays which is non-colinear relative to said first beam to cause the medians of the two X-ray beams to intersect on the axis of movement of the article to be inspected, a pair of fluorescent screens each disposed perpendicular to the median of the respective X-ray beams, and means for reflecting the image cast on said fluorescent screens to enable an observer to view the image and inspect the article during transit through said cabinet.

4. A biplanar fluoroscopic and radiographic apparatus comprising a cabinet, means for passing an article to be inspected through said cabinet, a source for projecting a beam of X-rays in a preselected direction, a second source for projecting another beam of X-rays which is non-colinear relative to said first beam to cause the medians of the two X-ray beams to intersect on the axis of movement of the article to be inspected, a pair of fluorescent screens each disposed perpendicular to the median of the respective X-ray beams, means for observing the image cast on said fluorescent screens to enable an operator to visually inspect the article during transit through said cabinet, and means movable into the field of radiation of said X-ray beams at the will of an operator for making a radiographic exposure of the article being inspected.

5. A biplanar fluoroscopic and radiographic apparatus comprising a cabinet, means for passing an article to be inspected through said cabinet, a source for projecting a beam of X-rays in a preselected direction, a second source for projecting another beam of X-rays which is non-colinear relative to said first beam to cause the medians of the two X-ray beams to intersect on the axis of movement of the article to be inspected, a pair of fluorescent screens each disposed perpendicular to the median of the respective X-ray beams, means for observing the image cast on said fluorescent screens to enable an operator to visually inspect the article during transit through said cabinet, and means automatically operable to move said fluorescent screens out of the field of radiation of said X-ray beams and to move a sensitized film into the field of radiation of said X-ray beams for making a radiographic exposure of the article being inspected.

6. A biplanar fluoroscopic and radiographic apparatus comprising a cabinet, means for passing an article to be inspected through said cabinet, a source within said cabinet for projecting a beam of X-rays in a preselected direction, a second source within said cabinet for projecting another beam of X-rays which is non-colinear relative to said first beam to cause the medians of the two X-ray beams to intersect on the axis of movement of the article to be inspected, a pair of fluorescent screens each disposed perpendicular to the median of the respective X-ray beams, and a pair of mirrors disposed parallel to each other and at an angle to said fluorescent screens for reflecting the image cast on the latter to enable an observer to visually inspect the article during transit through said cabinet.

7. A biplanar fluoroscopic and radiographic apparatus comprising a cabinet, means for passing an article to be inspected through said cabinet, a source within said cabinet for projecting a beam of X-rays in a preselected direction, a second source within said cabinet for projecting another beam of X-rays which is non-colinear relative to said first beam to cause the medians of the two X-ray beams to intersect on the axis of movement of the article to be inspected, a carriage movable transversely of said cabinet and provided with a pair of fluorescent screens each normally disposed perpendicular to the medians of the respective X-ray beams and a cassette for holding a sensitized film carried by said carriage and disposed out of the field of radiation of said X-ray beams when said carriage is at one extremity of its movement, means for holding said carriage in one extremity of its movement, means for observing the image cast on said fluorescent screens to enable an operator to visually inspect the article during transit through said cabinet, and means operable to release said carriage-holding means to cause movement of said carriage to dispose said cassette in the field of radiation of said X-ray beams for the making of a radiographic exposure of said article at the will of the operator.

8. A biplanar fluoroscopic and radiographic apparatus comprising a cabinet, means for passing an article to be inspected through said cabinet, a source within said cabinet for projecting a beam of X-rays in a preselected direction, a second source within said cabinet for projecting another beam of X-rays which is non-colinear relative to said first beam to cause the medians of the two X-ray beams to intersect on the axis of movement of the article to be inspected, a carriage movable transversely of said cabinet and provided with a pair of fluorescent screens each normally disposed perpendicular to the medians of the respective X-ray beams and a cassette for holding a sensitized film carried by said carriage and disposed out of the field of radiation of said X-ray beams when said carriage is at one extremity of its movement, means for holding said carriage in one extremity of its movement, a pair of inclined mirrors disposed parallel to each other and at an angle to said fluorescent screens for reflecting the image cast on the latter to enable an observer to visually inspect the article during transit through said cabinet, and a tripping member operable to release said carriage holding means to cause automatic movement of said carriage transversely of said cabinet to dispose said cassette in the field of radiation of said X-ray beams for the making of a radiographic exposure of said article at the will of the operator.

VICTOR HICKS.
EUGENE E. MERKEL.